(12) United States Patent
Nordin et al.

(10) Patent No.: US 9,927,149 B2
(45) Date of Patent: Mar. 27, 2018

(54) METHOD FOR USING CONCENTRATED SOLAR POWER

(71) Applicant: Rodluvan Inc., Southern Pines, NC (US)

(72) Inventors: Kenneth Nordin, Bratislava (SK); Mats Olof Erik Mattsson, Oviken (SE)

(73) Assignee: Rodluvan Inc., Southern Pines, NC (US)

( * ) Notice: Subject to any disclaimer, the term of this patent is extended or adjusted under 35 U.S.C. 154(b) by 0 days.

(21) Appl. No.: 15/318,992

(22) PCT Filed: Aug. 19, 2015

(86) PCT No.: PCT/US2015/045919
§ 371 (c)(1),
(2) Date: Dec. 15, 2016

(87) PCT Pub. No.: WO2016/032826
PCT Pub. Date: Mar. 3, 2016

(65) Prior Publication Data
US 2017/0153044 A1 Jun. 1, 2017

Related U.S. Application Data

(60) Provisional application No. 62/042,903, filed on Aug. 28, 2014.

(51) Int. Cl.
F24J 2/32 (2006.01)
F24J 2/34 (2006.01)
F24J 2/24 (2006.01)
F24J 2/04 (2006.01)

(52) U.S. Cl.
CPC .. *F24J 2/34* (2013.01); *F24J 2/04* (2013.01); *F24J 2/24* (2013.01); *F24J 2/32* (2013.01)

(58) Field of Classification Search
CPC .. F24J 2/34; F24J 2/32; F24J 2/24; F24J 2/04
USPC ........................ 126/714, 634, 617; 60/641.15
See application file for complete search history.

(56) References Cited

U.S. PATENT DOCUMENTS

| | | |
|---|---|---|
| 4,421,102 A | 12/1983 | Posnansky et al. |
| 4,611,755 A | 9/1986 | Miyanaga et al. |
| 4,841,946 A | 6/1989 | Marks |
| 8,839,783 B2 * | 9/2014 | Hernandez ............... F21S 11/00 126/605 |
| 2006/0236624 A1 * | 10/2006 | Blair ....................... E04C 1/397 52/220.1 |
| 2010/0024805 A1 | 2/2010 | Raymond et al. |
| 2010/0066254 A1 | 3/2010 | Newman |
| (Continued) | | |

*Primary Examiner* — Gregory Huson
*Assistant Examiner* — Nikhil Mashruwala
(74) *Attorney, Agent, or Firm* — Fasth Law Offices; Rolf Fasth

(57) ABSTRACT

The method is for using solar power in an efficient manner. A solar concentrator is provided in operative engagement with a storage unit. The storage unit has at least one glass rod disposed therein and at least one sheet enclosing the storage unit. The solar concentrator receives solar power as sunrays and conveys the solar power to the glass rod disposed in the storage unit. The solar power is in the glass rod is converted to heat to heat to the storage unit. Gas flows between the storage unit and the sheets. The storage unit heats the gas. The gas flows to a heat exchanger to exchange heat with steam.

6 Claims, 5 Drawing Sheets

(56) References Cited

U.S. PATENT DOCUMENTS

2011/0079267 A1\* 4/2011 Raymond ............... F03G 6/067
                                                              136/246
2012/0111006 A1  5/2012 Varga \* cited by examiner

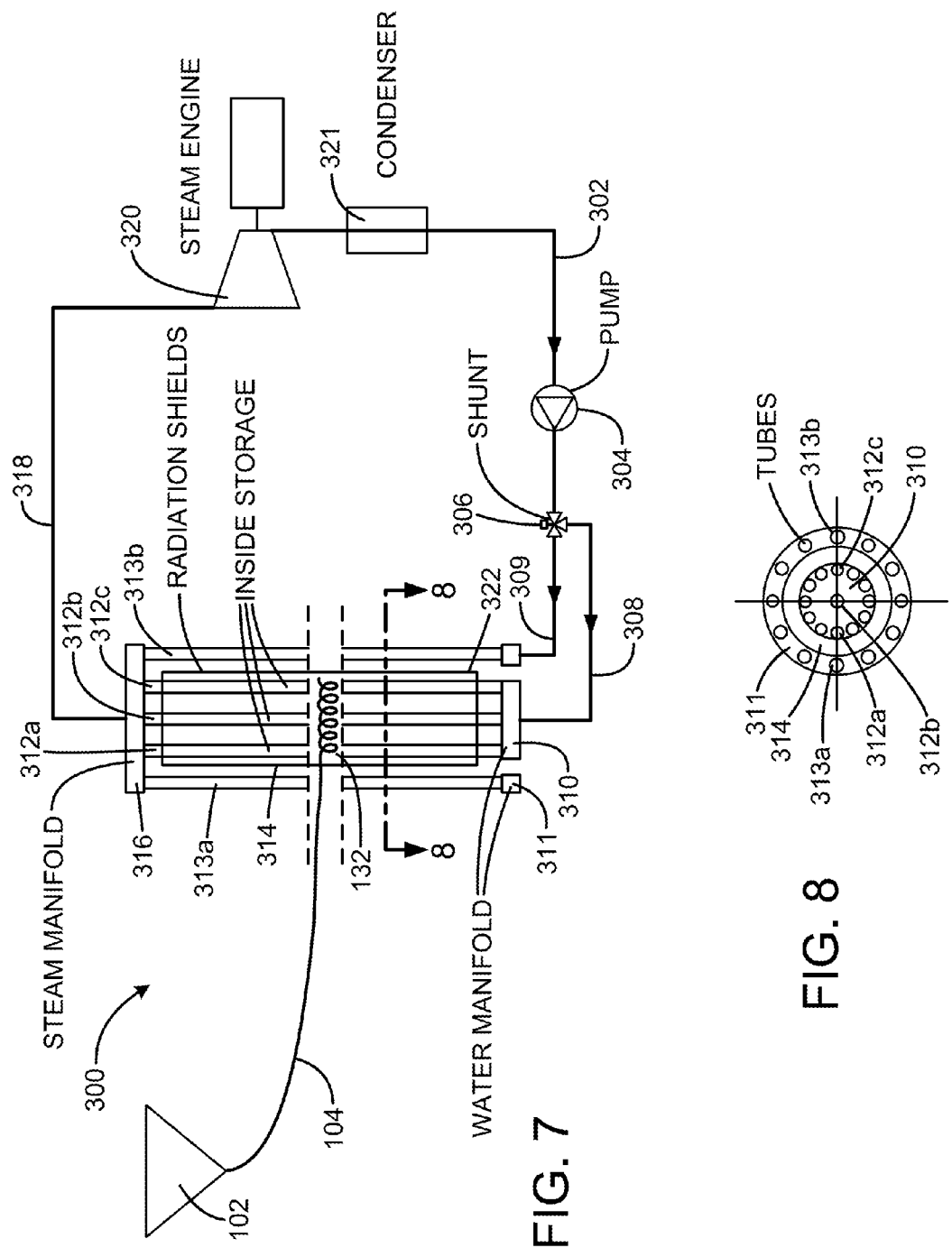

METHOD FOR USING CONCENTRATED SOLAR POWER

PRIOR APPLICATIONS

This is a US national phase patent application that claims priority from PCT/US2015/045919 filed 19 Aug. 2015, that claims priority from U.S. Provisional Patent Application No. 62/042,903, filed 28 Aug. 2014.

TECHNICAL FIELD

The invention relates to a method for using concentrated solar power.

BACKGROUND AND SUMMARY OF THE INVENTION

Solar power or solar energy has been used for many decades for heating dwellings and water and for generating electricity. Because solar power is a renewable energy source much effort has been made to develop systems to use such energy. The costs have been high and the storage of energy has not been very effective. It has been particularly difficult and expensive to store energy at very high temperatures (900-1000° C.) due to large heat losses. However, the efficiency of conventional systems has been low and there is a need for a more efficient and cost effective system.

The method of the present invention provides a solution to the above-outlined problems. More particularly, the method is for using solar power in an efficient manner. A solar concentrator is provided that is in operative engagement with a storage unit. The storage unit has at least one glass rod disposed therein and at least one sheet enclosing the storage unit. The solar concentrator receives solar power, concentrates the solar power before conveying the solar power as light to the glass rod disposed in the storage unit. The glass rod emits light and the light is converted to heat upon impact with the storage unit to heat the storage unit. Gas or water steam flows between the storage unit and the sheets. The storage unit heats the gas. The gas or water steam flows to a heat exchanger to continuously exchange heat with steam.

In another embodiment, the solar concentrator is connected to a fiber optic cable that is connected to the glass rod disposed inside the storage unit.

In another embodiment, the glass rod could be formed into a spiral shape.

In yet another embodiment, a plurality of sheets as sheet layers enclose the storage unit and gas flows between each sheet layer.

In another embodiment, the fiber optic cable guides the solar power as light at different wave lengths towards a center of the fiber optic cable.

In yet another embodiment, the fiber optic cable transmits the centered solar power to the glass rod.

BRIEF DESCRIPTION OF DRAWINGS

FIG. 7 is a schematic view of an alternative embodiment of the present invention; and FIG. 8 is a cross-sectional view along line A-A of FIG. 7.

DETAILED DESCRIPTION

Figure 1:
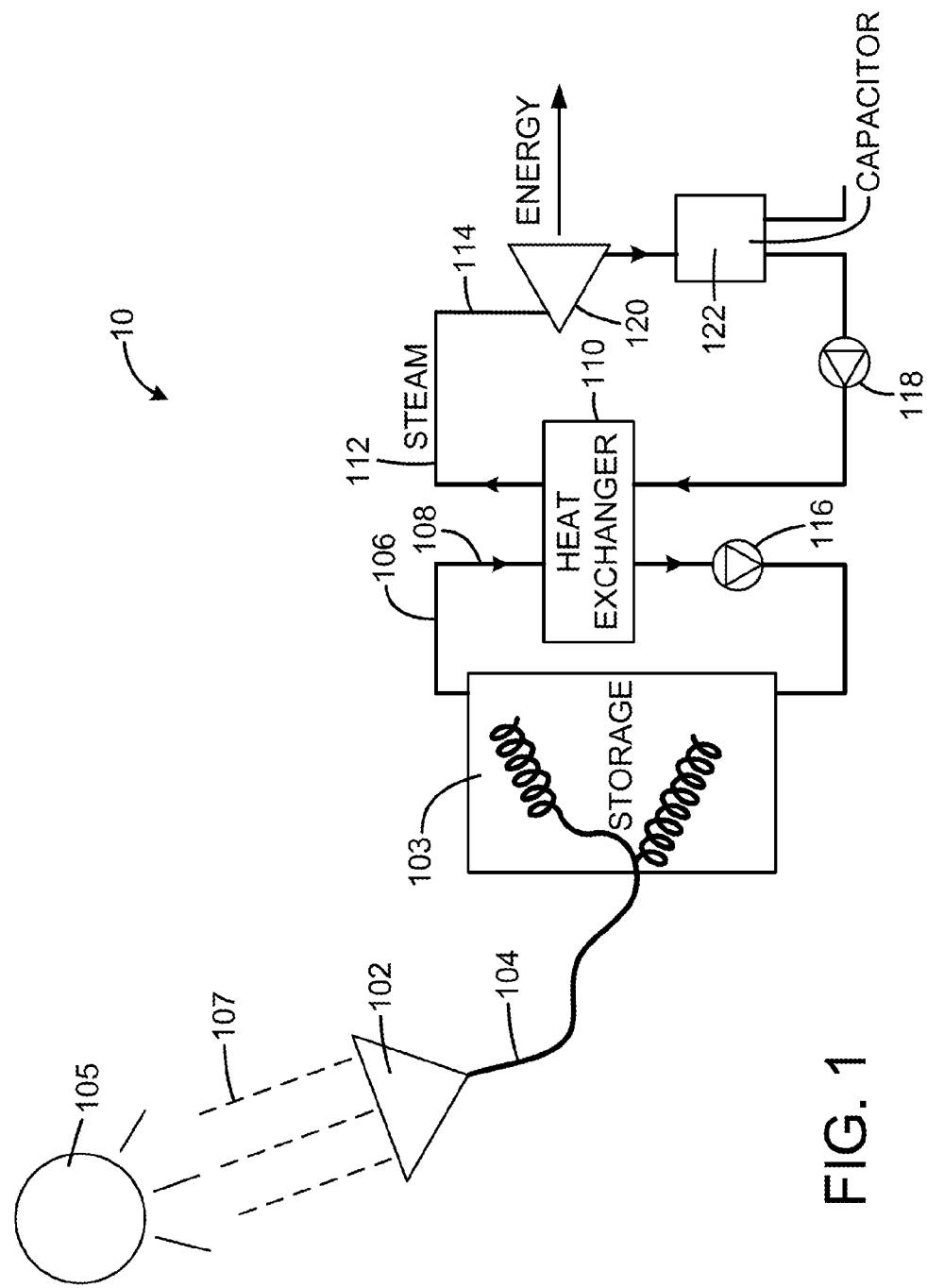
FIG. 1 is a schematic view of a solar power system of the present invention.

FIG. 1 is a schematic overview of the solar power system 100 of the present invention. It has a solar concentrator 102 that concentrates beams or rays 107 received from the sun 105 and conveys the light beams to a fiber-optic cable 104. The solar concentrator 102 has suitable lenses, such as Fresnel lenses or a solar guiding system, to concentrate the sunrays to a focal point. In one preferred embodiment, if the lens is about one square meter then the focal point, after the concentration of the sun rays by the lens, has a diameter of about 18 millimeters or less. It is desirable to further concentrate the sun rays so that the focal point is about 2 square millimeters which is about the same as the size of each fiber. It is possible to use many fibers in each cable so that a plurality of lenses in the solar concentrator may be used also to increase the amount of energy conveyed by the cable. For example, if the total area of all the lenses is about 25 square meters in the solar concentrator then about 25 fibers may be included in the cable.

The cable 104 may be made of doped glass that includes a carbon pattern that can handle all the visible wave-lengths of the sun light or sun rays received by the concentrator 102. In general, the visible wave-lengths have the most energy and are the most desirable to convey. The carbon pattern may have hollow rods of different sizes around a central opening of the fiber that extend along the fiber that act as reflection surfaces and guide the sun rays or light towards the central opening of each fiber in the cable 104. For example, each fiber may contain seven hollow rods and each rod is about 1.7 micrometers. Other dimensions may also be used. In this way, it is possible to effectively transport the sun rays or light of different wave-lengths via the cable 104. The cable 104 may be bendable (or non-bendable) and carries the light at a range of visible (and non-visible) wave-lengths. Instead of using the cable 104 it is also possible to use solid glass in the fibers although the energy losses are greater, the range of wave-lengths that can be carried is more limited and it may be necessary to use relatively thick glass rods which are difficult or impossible to bend without breaking the rods.

The concentrator 102 is connected to a high-temperature storage system 103 via the fiber-optic cable 104 that carries the conveyed light energy to the storage system 103 where it is converted to heat. The storage system 103 may be made of any suitable material such as concrete, sand or any other material that is suitable for storing heat in a range of 300-1000° C. Preferably, the temperatures are higher than 300 C in order to make electricity. Gas 106, such as argon, circulates in conduits 108 the storage system 102 and heat is exchanged in a heat exchanger 110 to heat steam 112 flowing in a circulation conduit 114. Pumps 116, 118 may be used to drive the gas 106 and steam 112, respectively. A steam turbine 120 is connected to the conduit 114 and to a capacitor 122. It is also possible to place the heat exchanger 110 inside storage 103 to eliminate the need for the gas 106 and the circulation line and pump 116.

Figure 2:
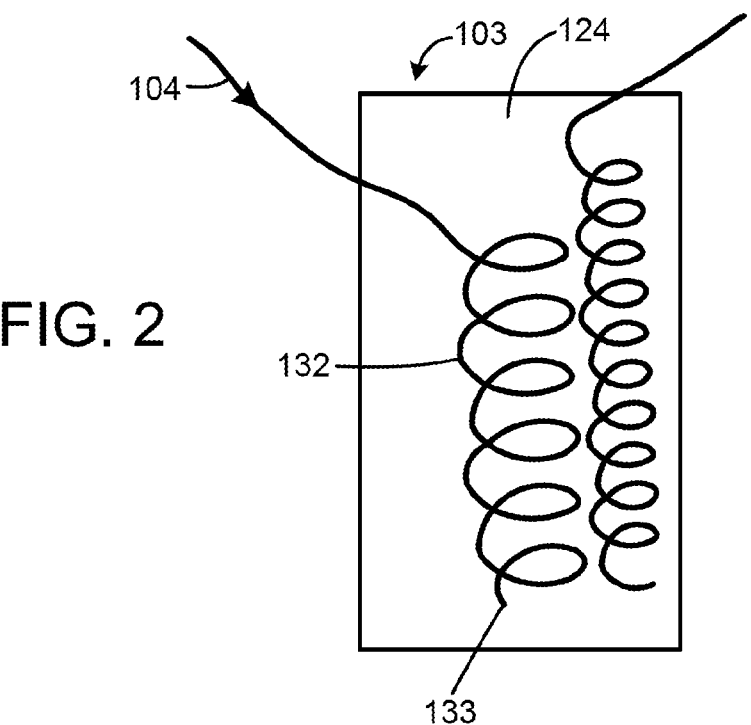
FIG. 2 is a cross-sectional side view of a first embodiment of the storage unit.

FIG. 2 is a cross-sectional side view of a first embodiment of the storage unit 103. The fiber cable 104 is connected to relatively long spiral-formed glass-rods 132 disposed inside the storage unit 103. It is also possible to direct the light directly from the solar concentrator 102 via the air to the ends of the glass-rods that extend out of the storage unit 103. One drawback of the latter design is that the solar concentrator 102 should be relatively close to the storage unit and that the storage unit 103 must be unobstructed and visible from the solar concentrator. Another option is to use the solar power to heat gas that, in turn, is circulated into the storage unit 103 to heat the glass rods disposed in the unit.

The hot glass-rods 132 convert the light energy, carried in the fiber cable 104, to heat which is used to heat the storage unit 103. More particularly, as the rods 132 emit light inside the storage unit 103 the light energy is converted into heat. When the rods are substantially straight the light is reflected on the inside walls of the fiber cable and no or very little light is emitted. However, when the fiber cable is sufficiently bent or curved then light escapes from the fiber. In other words, the light energy is mostly emitted where the rods are bent and this light energy is converted into heat. The spiral shape of the rods 132 increases the contact surface area against the storage unit 103 to improve the transfer of heat from the glass-rods 132 to the storage unit 103. At the end 133 of the rods 132 very little light energy remains so the end does not create much heat. As mentioned above, it is also possible to transfer the light energy from the solar concentrator 102 directly to the storage 103 by directly directing or reflecting the light energy to the glass-rods 132 that are sticking out of the storage unit 124. In this way, the glass rods 132 are heated. A straight rod, shaped like a cone, also works but makes it more difficult to accomplish an even energy distribution in the storage unit.

Figure 3:
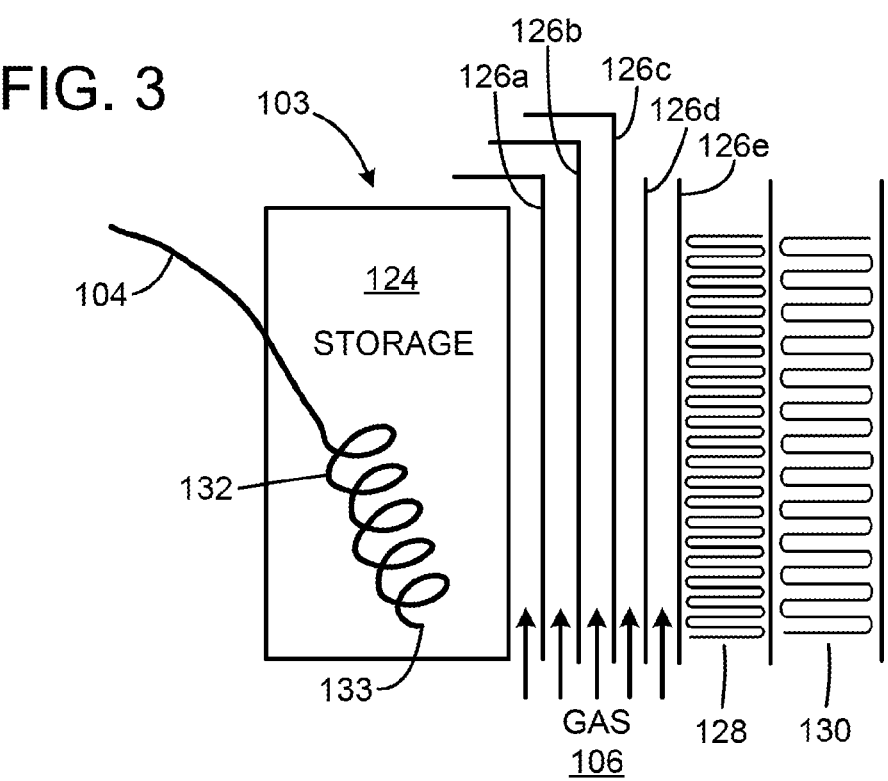
FIG. 3 is a detailed cross-sectional view of the storage system.

FIG. 3 is a schematic cross-sectional view of the storage system 103 that includes a storage unit 124 and several layers of sheets 126*a*-126*e* completely enclosing and surrounding the storage unit 124. Only a portion of the sheets are shown in FIG. 3. The system 103 of the present invention may use more or fewer sheets as necessary. Gas 106 flows between the sheets 126*a*-126*e*. The circulating gas is heated by the hot storage unit 124 and may be used to produce electricity, as described below. Each sheet reflects back heat to the gas flowing between the sheets. The first sheet 126*a* may reduce the heat emitted from the unit 124 with up to 50%. Sheets 126*b*-126*e* continue reducing the heat emitted by reflecting in back to heat the gas flowing between the sheets. The gas thus cools down the sheets 126*a*-126*e*. Preferably, the gases from each layer are mixed before they enter the heat exchanger 109.

High temperature insulation 128 is preferably used between the outer sheet 126*e* and low temperature insulation 130. The temperature at the outer sheet 126*e* may be about 100-600° C. and the temperature between the high temperature insulation 128 and the low temperature insulation 130 may be about 50-300° C. or any other suitable temperature. The temperature outside insulation layer 130 may be ambient or about 20° C. Because the circulating gas 106 cools the storage unit 124, it is possible to use less expensive insulation layers 128, 130 that are designed for insulating temperatures in the range of 100-600 C. It was surprisingly discovered that the gases reduce the temperature so much that virtually no insulation layers 128, 130 are necessary. An important feature of the present invention is thus to use the heat losses from storage unit 124 for further use such as making electricity. Another important aspect is that the heat losses are continuously being recovered although the sun may not be out to provide the solar power. The storage unit should be designed so that it stores energy for up to 4-6 months so that heat generated during the summer months can be used during the winter months.

Figure 4:
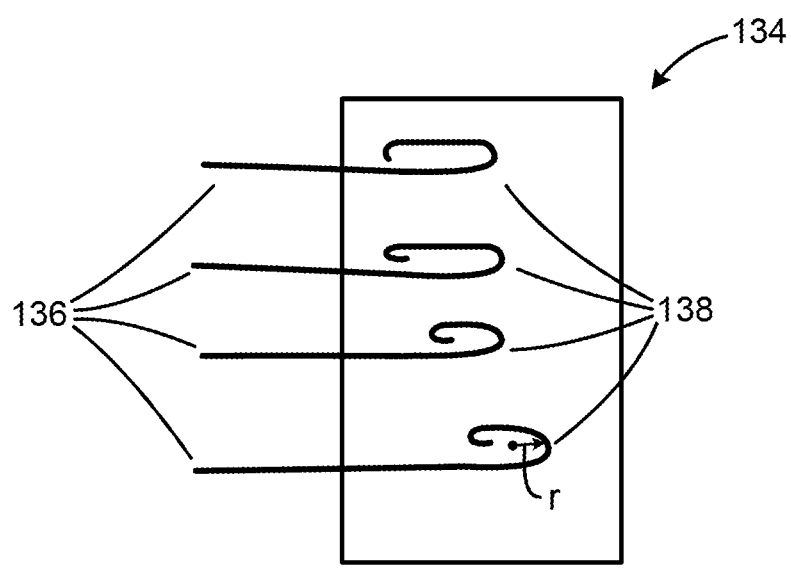
FIG. 4 is a cross-sectional view of a second embodiment of the storage unit.

FIG. 4 is a cross-sectional side view of a second embodiment of the storage unit 134 that includes a plurality of relatively short glass rods 136 that release or transfer much more energy at each bend 138 compared to the energy transferred at each bend of the glass-rods 136 mainly because the rods are bent more. This is to illustrate that the emission of light energy varies depending on the shape or form of the glass rods. In general, the larger the radius (r) of the curvature of the glass rods, the less energy is emitted from the glass rods.

Figure 5:
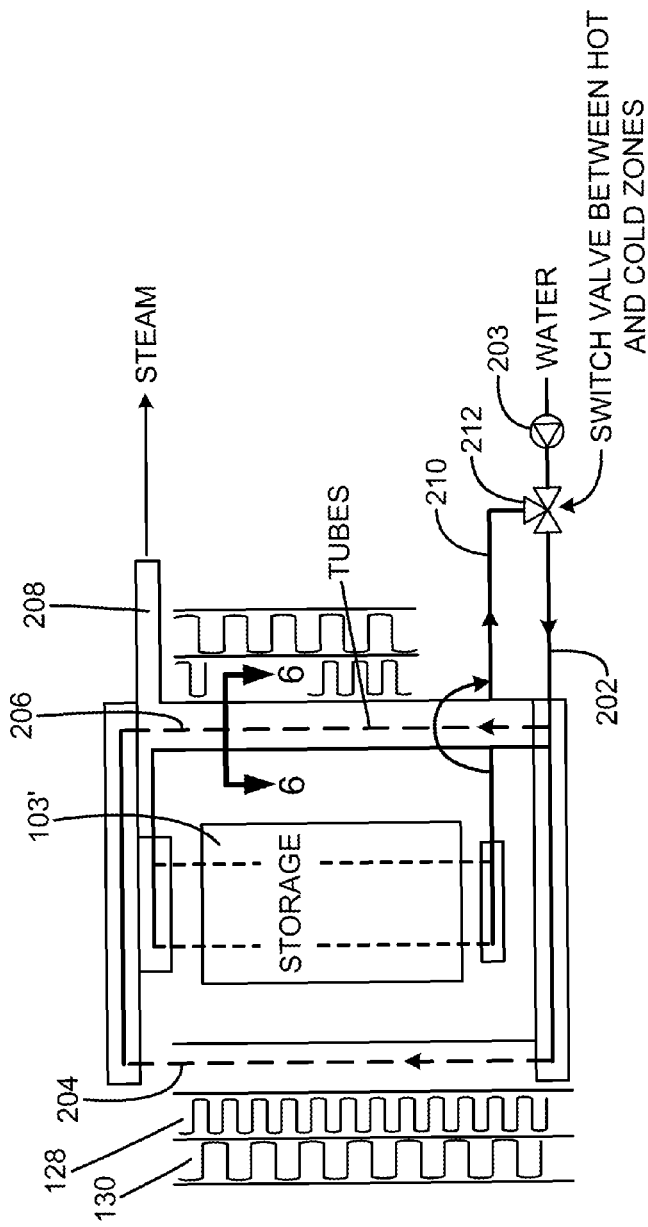
FIG. 5 is a schematic view of an alternative embodiment of the present invention.

FIG. 5 is a schematic view of an alternative embodiment of a system 200 of the present invention. Storage 103' is connected to concentrator 102 as described in FIG. 1 and insulation layers 128,130 encapsulate the storage unit 103'. Water comes in via tube 202, pumped by pump 203, and is split up between vertical tubes 204 and 206 so that the water is heated to steam by storage unit 103' and steam flows away from unit 103' via conduit 208. A re-circulation loop 210 may be connected to a switch valve 212 to use heat from the inside of the storage unit 103' when the outside of the storage unit 103' is not hot enough.

Figure 6:
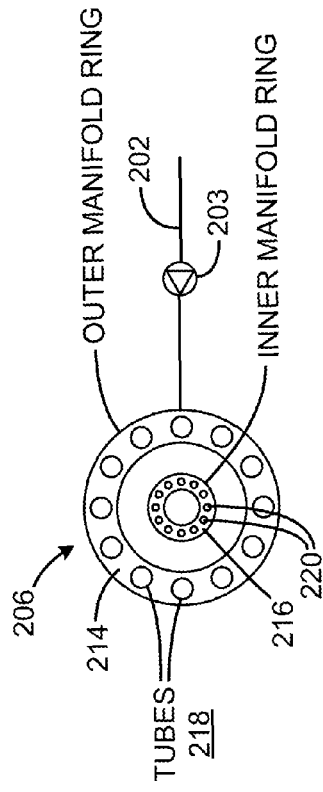
FIG. 6 is a cross-sectional view along line A-A of FIG. 5.

FIG. 6 is a top cross-section view of tube 206 along line A-A of FIG. 5. Preferably, tube 206 has an outer manifold ring 214 and an inner manifold ring 216. Each manifold ring includes a plurality of small tubes 218, 220, respectively.

FIGS. 7-8 are a schematic view of an alternative embodiment 300. A liquid, such water, flows in conduit 302 and is pumped by pump 304 via a valve 306 into conduit 308 that extends to an inner water manifold 310 or into conduit 309 that extends to a round peripheral water manifold 311. The pressure at pump 304 may be about 1 bar or any other suitable pressure. The valve 306 may be used to control the flow of water between conduit 308 and 309. A plurality of inner tubes 312*a*-*c*, are in fluid communication with manifold 310 to carry the water through the heated storage system 314 that is substantially similar to storage system 103. The tubes 312*a*-*c* extend through storage system 314 to a steam manifold 316 and then flows as steam into a common conduit 318. The pressure of the steam in steam manifold 316 may be 20 bars or a pressure substantially higher than the pressure at pump 304. As best seen in FIG. 8, there are more inner tubes used and only inner tubes 312*a*-*c* are shown in FIG. 7. The storage system 314 heats the water to steam. Peripheral tubes 313*a*-*b* extend between water manifold 311 to steam manifold 316 outside storage system 314. As best shown in FIG. 8, there are more peripheral tubes than tubes 313*a*-*b* that are shown in FIG. 7. Radiation shield 322 is disposed outside storage system 314 to act as a heat shield and preferably, tubes 313*a*-*b* and all the other peripheral tubes connected to water manifold 311 are immediately adjacent to or in contact with the radiation shield 322. In this way, heat losses from the storage system 314 are transferred to the water flowing in the peripheral tubes 313*a*-*b* and the other peripheral tubes connected to water manifold 311. The water in tubes 313 is heated to steam. Conduit 318 extends from steam manifold 316 to a steam engine 320, to generate power such as electricity, and then further to a condenser 321 where the pressure and temperature are reduced so that the steam is condensed to water again. Preferably, the temperature of the over-heated pressurized steam when it enters the steam engine 320 should be several hundred degrees Celsius such as about 200-225 C. After the condenser 321, the water flows to pump 304 to be re-circulated into the storage system 314 again in the same way as described above. When there is not enough heat in storage system 314 then the water is directed via conduit 308 by switching valve 306 to open the flow into conduit 308. When the storage system 314 is hot enough, such as when the temperature in the storage system 314 is between 200-225 C, then the valve 306 may be used to direct water via conduit 309 into water manifold 311 to flow in the peripheral tubes 313 into steam manifold 316. It is also possible to successively open the valve 306 so that there is flow in both conduit 308 and 309 and the exact flow in the conduits 308, 309 may be set by valve 306. In this way, the flow in conduit 308 may be higher than conduit 309 or vice versa.

While the present invention has been described in accordance with preferred compositions and embodiments, it is to be understood that certain substitutions and alterations may be made thereto without departing from the spirit and scope of the following claims.

We claim:

1. A method for using solar power, comprising, providing a solar concentrator in operative engagement with a first end of a fiber optic cable, the fiber optic cable having a second end in operative engagement with a storage unit, the storage unit having a solid glass rod disposed inside the storage unit and a sheet enclosing the storage unit, the solid glass rod, having a short end being connected to the second end of the fiber optic cable, being disposed outside the storage unit, the solar concentrator receiving solar power and conveying the solar power as light, via the fiber optic cable into the short end of the solid glass rod, the solid glass rod being disposed inside the storage unit, the solid glass rod transferring the light from the fiber optic cable outside the storage unit into the inside of the storage unit and emitting the light inside the storage unit and the light being converted to heat upon impact with the storage unit to heat the storage unit, gas flowing between the storage unit and the sheet, the storage unit heating the gas, and the gas flowing to a heat exchanger to continuously exchange heat with steam.

2. The method of claim 1 wherein the solar concentrator is connected to a bendable fiber optic cable that is connected to the glass rod disposed inside the storage unit.

3. The method according to claim 1 wherein the method further comprises the step of forming the glass rod into a spiral shape.

4. The method according to claim 1 wherein the method further comprises the step of having a plurality of sheets as sheet layers enclosing the storage unit and gas flowing between each sheet layer.

5. The method according to claim 2 wherein the method further comprises the step of the fiber optic cable guiding the solar power at different wave lengths towards a center of the fiber optic cable.

6. The method according to claim 5 wherein the method further comprises the step of the fiber optic cable transmitting the centered solar power to the glass rod.

* * * * *